(12) United States Patent
Wang et al.

(10) Patent No.: US 7,900,972 B2
(45) Date of Patent: Mar. 8, 2011

(54) FLUID CONNECTOR FOR GARDEN USE

(76) Inventors: King Yuan Wang, Changhua Hsien (TW); Shun Nan Lo, Changhua Hsien (TW)

( * ) Notice: Subject to any disclaimer, the term of this patent is extended or adjusted under 35 U.S.C. 154(b) by 530 days.

(21) Appl. No.: 11/730,024

(22) Filed: Mar. 29, 2007

(65) Prior Publication Data

US 2008/0238087 A1    Oct. 2, 2008

(51) Int. Cl.
*F16L 37/18* (2006.01)
(52) U.S. Cl. .................. 285/315; 285/314; 285/322
(58) Field of Classification Search .................. 285/314, 285/315, 316, 319, 321, 322, 323
See application file for complete search history.

(56) References Cited

U.S. PATENT DOCUMENTS

| | | | | |
|---|---|---|---|---|
| 3,797,764 A * | 3/1974 | Guth | ............ | 241/46.015 |
| 3,847,393 A * | 11/1974 | Busselmeier | ............ | 285/315 |
| 4,796,856 A * | 1/1989 | Munini | ............ | 251/149.5 |
| 6,199,913 B1 * | 3/2001 | Wang | ............ | 285/24 |
| 6,467,816 B1 * | 10/2002 | Huang | ............ | 285/316 |
| 6,786,516 B2 * | 9/2004 | Cronley | ............ | 285/322 |
| 7,021,669 B1 | 4/2006 | Lindermeir et al. | | |
| 7,431,346 B2 * | 10/2008 | Frost et al. | ............ | 285/317 |

* cited by examiner

*Primary Examiner* — James M Hewitt
*Assistant Examiner* — Gwendolyn D Fournet
(74) *Attorney, Agent, or Firm* — Raymond Y. Chan; David and Raymond Patent Firm

(57) ABSTRACT

An improved fluid connector for garden use includes a tube body, a resilient retainer and a sleeve associated therewith. The tube body includes a plurality of holes for accommodation of a locking hook respectively and the resilient retainer is peripherally equipped with several pairs of vertical flexible ribs with an expansion space defined therebetween. On an inner wall of the sleeve, a plurality of push protrusions is disposed and is positioned in relationship with the vertical flexible ribs respectively so that, as the sleeve is pushed downwardly, the flexible ribs may be forced to deform and produce an reactive force that can instantly push the push protrusions of the sleeve back to their original place when the sleeve is free of an external force.

7 Claims, 23 Drawing Sheets

FLUID CONNECTOR FOR GARDEN USE

BACKGROUND OF THE INVENTION

The present invention relates to an improved fluid connector for garden use which is made up of a tube body, a resilient retainer and sleeve. The tube body is provided with a plurality of holes for accommodation of a locking hook respectively and the resilient retainer is peripherally equipped with several pairs of vertical flexible ribs with an expansion space defined therebetween. On the inner wall of the sleeve are disposed a plurality of push protrusions that are positioned in relationship with the vertical flexible ribs respectively so that as the sleeve is pushed downwardly, the flexible ribs can be forced to deform and store an reactive force that can instantly push the push protrusions of the sleeve back to their original place when the sleeve is free of an external force, making the operation of the sleeve smoother and easier without causing the resilient retainer of the conventional fluid connector to get stuck when the sleeve is pushed downwardly as a result of deformation and fatigue in operation.

As shown in FIG. 1, the perspective diagram shows the exploded components of the prior art cited by the present inventor. It includes a tube body 10, a locking collar 20, a sleeve 30 and a resilient retainer 40 wherein the tube body 10 is has a tubular passage from end to end with a connection tube 11 extended from one end of the tube body 10 to form a flanged section. The other end of the connection tube 11 extends to the end of the tube body 10 with a plurality of fastening dents 12 disposed thereat and a support flange 13 defined at the middle of the tube body 10 and having a limiting projection 131 placed on the periphery thereof. There are a plurality of axially extended and equally spaced guide ditches 14 defined on the front section of the tube body 10 and each having a pair of uprising guard ribs 141, 142. A through hole 15 is disposed on each guide ditch 14 and a sealing flange 16 is defined at the front end of the tube body 10. The locking collar 20 having a terminal end defined in a tapered form is engaged with the end of the tube body 10 by threaded sections so that the tapered end 21 of the locking collar 20 can force the tightening dents 12 to clamp an inserted hose or pipe in place. Moreover, the sleeve 30 has a plurality of abutment blocks 31 disposed on the inner wall thereof in alignment with the through holes 15 of the tube body 10

Such a prior art structure of the fluid connector has the following disadvantages in practice:
1. the elastic component 43 of the resilient retainer 40 is made in an arc shape and can be easily deformed under pressure as shown in FIG. 2 when the sleeve 30 is actuated by a user, resulting in the decreasing of the elasticity and the loss of the limiting function of the abutment blocks 31. Thus, the integral operation life span of the fluid connector is unavoidably shortened;
2. the elastic components 43 of the resilient retainer 40 is of an arc shape, the locking unit 42 is easily stuck as a result of the uneven application of force when the sleeve 30 is actuated, making the push and pull of the sleeve 30 unsmooth and inconvenient;
3. the coupling pipe A can get easily loose from the engagement of the locking unit 42 as long as the sleeve 30 is pushed downwardly and the coupling pipe A can accidentally fly off under a great water pressure in a sprinkling process. Thus, the person in operation of the sprinkler will be splashed and gets wet by accident.

Moreover, the fluid connector illustrated in another published prior art disclosed in U.S. Pat. No. 7,021,669 is equipped with a number of insert bodies 5 and compression springs 3 housed in the coupling part 1. Such a structure is relatively complicated and is provided with relatively too many components, making the assembly thereof difficult and time consuming in one aspect and the production cost and processing

SUMMARY OF THE INVENTION

Therefore, the primary object of the present invention is to provide an improved fluid connector for garden use wherein the sleeve is equipped with a plurality of push protrusions on the inner wall thereof that cooperate with several pair of vertical flexible ribs disposed on the periphery of a resilient retainer so that the expansion space of each pair of flexible ribs can provide a reactive force to push each inserted push protrusion backwardly so that the sleeve relieved from external force will instantly resume to its original position. Such a structure can prevent a traditional resilient retainer from being stuck due to deformation and operational fatigue when the sleeve is forced downwardly. Thus, the operation of the fluid connector become smoother in one aspect and the production and assembly cost of the fluid connector can be effectively cut down in consideration of economy of production and competition of marketing in another aspect.

Another object of the present invention is to provide an improved fluid connector for garden use wherein the resilient retainer makes use of the inner wall cavity sections of its support wall sections and stop faces and registration cavities of restraint posts to abut against the support blocks and the engagement blocks of the tube body so as to offer double build-up support to the resilient retainer to make it stronger and more durable even under great pressure produced by the sleeve pushed downwardly.

One further object of the present invention is to provide an improved fluid connector for garden use wherein the sleeve is equipped with a plurality of guide posts peripherally disposed on the inner wall thereof which are in cooperation with guide openings, slide slopes, stop posts and restraint posts of the resilient retainer so as to permit each guide post of the sleeve to slide from each restraint post along the slide slope to the stop post respectively and to be limited in place thereat without going downwardly any further. In that manner the sleeve can be firmly limited in place and a coupling pipe will not instantly get disengaged under water pressure from the fluid connector when the sleeve is accidentally pressed down, causing sprinkled water to splash all over to get people around wet.

One furthermore object of the present invention is to provide an improved fluid connector for garden use wherein the engagement blocks of the tube body are used to just engage with the registration cavities of the stop posts and the restraint posts of the resilient retainer respectively whereby the resilient retainer can be prevented from rotation along with the sleeve, making the control of the positioning of the sleeve in a more precise manner.

DETAILED DESCRIPTION OF THE PREFERRED EMBODIMENTS

The best preferred embodiments of the present invention are hereinafter described in company with the drawings of the present invention.

Figure 1:
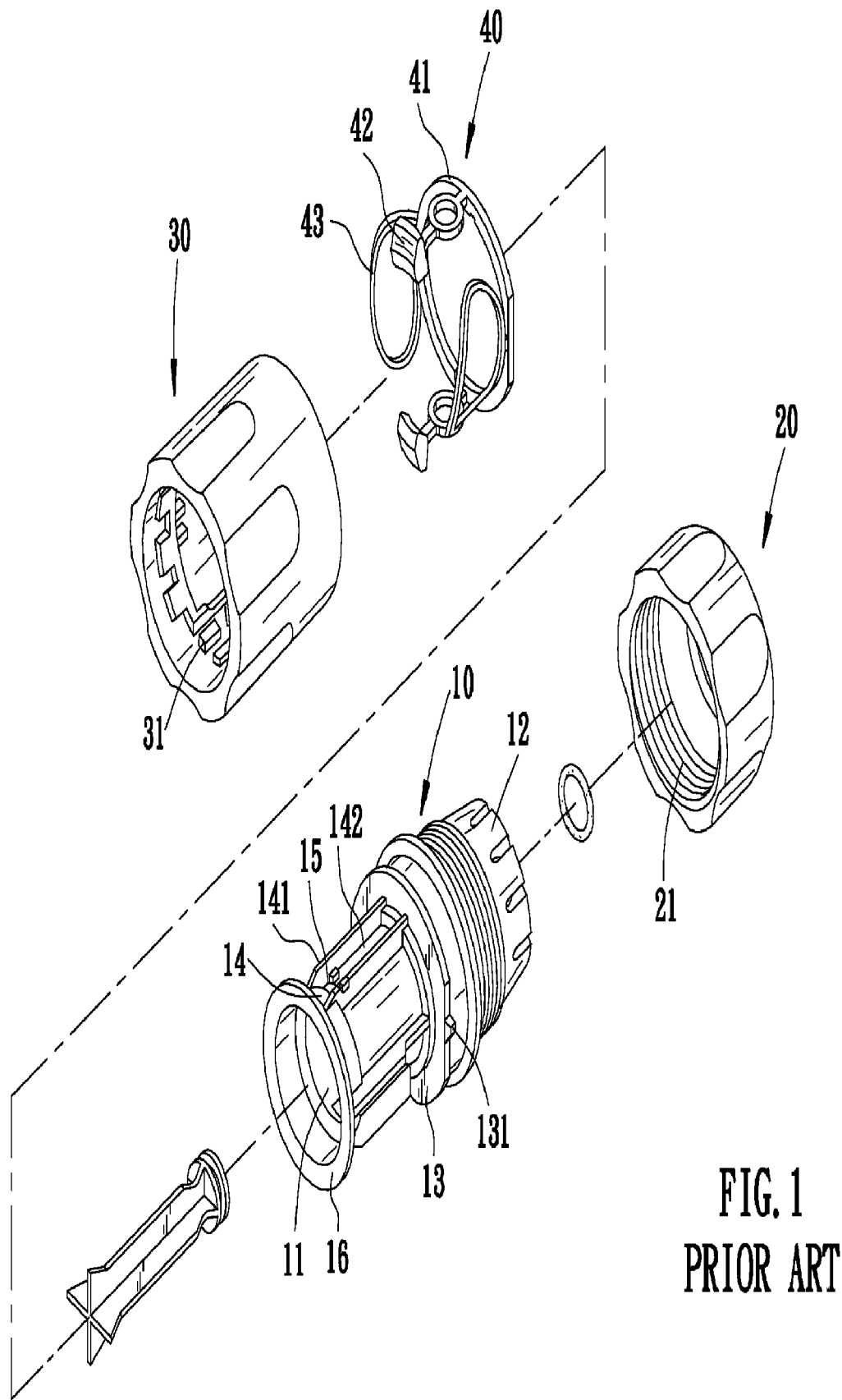
FIG. 1 is a diagram showing a prior art related to the present invention.
Figure 2:
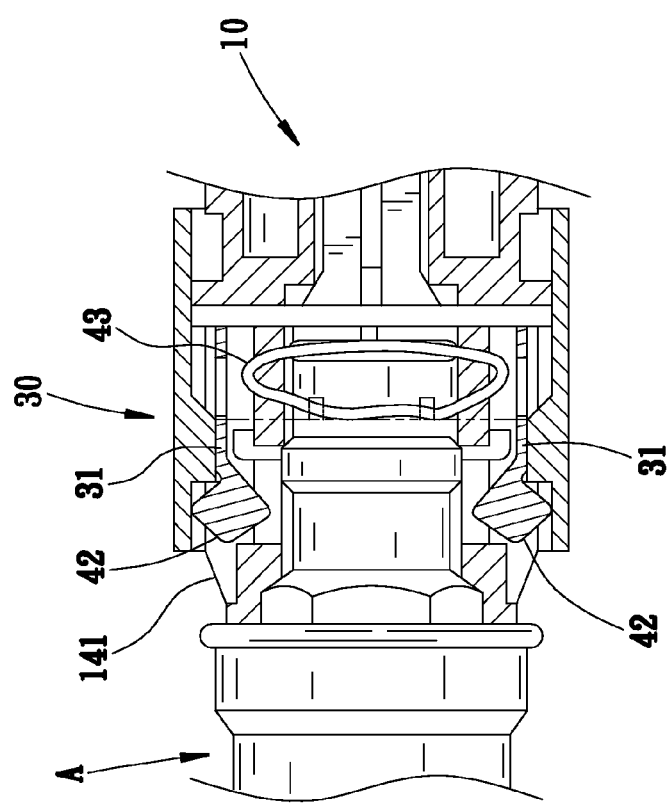
FIG. 2 is a diagram showing the resilient retainer of FIG. 1 in engagement when the sleeve is pushed downwardly.
Figure 3:
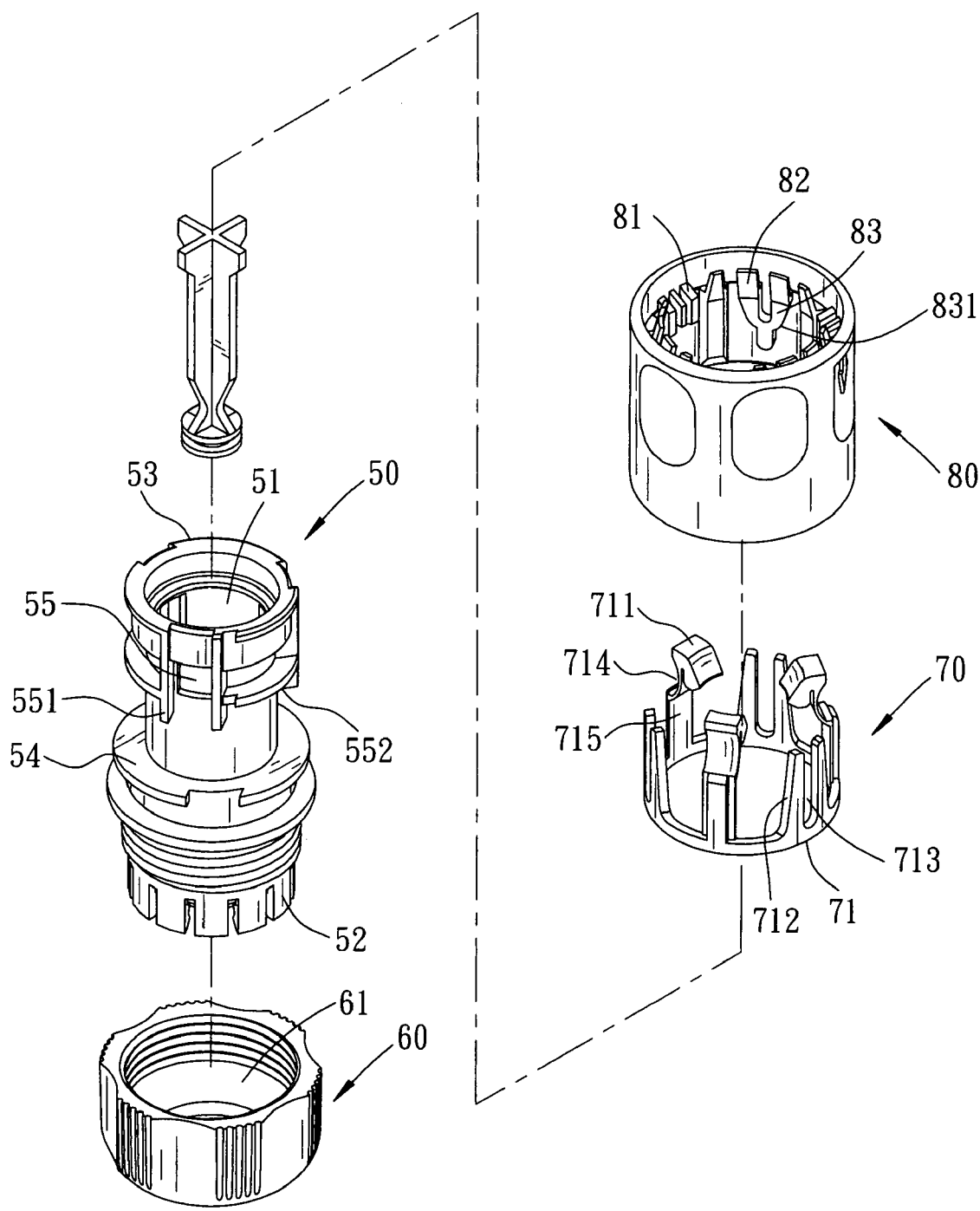
FIG. 3 is a perspective diagram showing the exploded components of the present invention.
Figure 4:
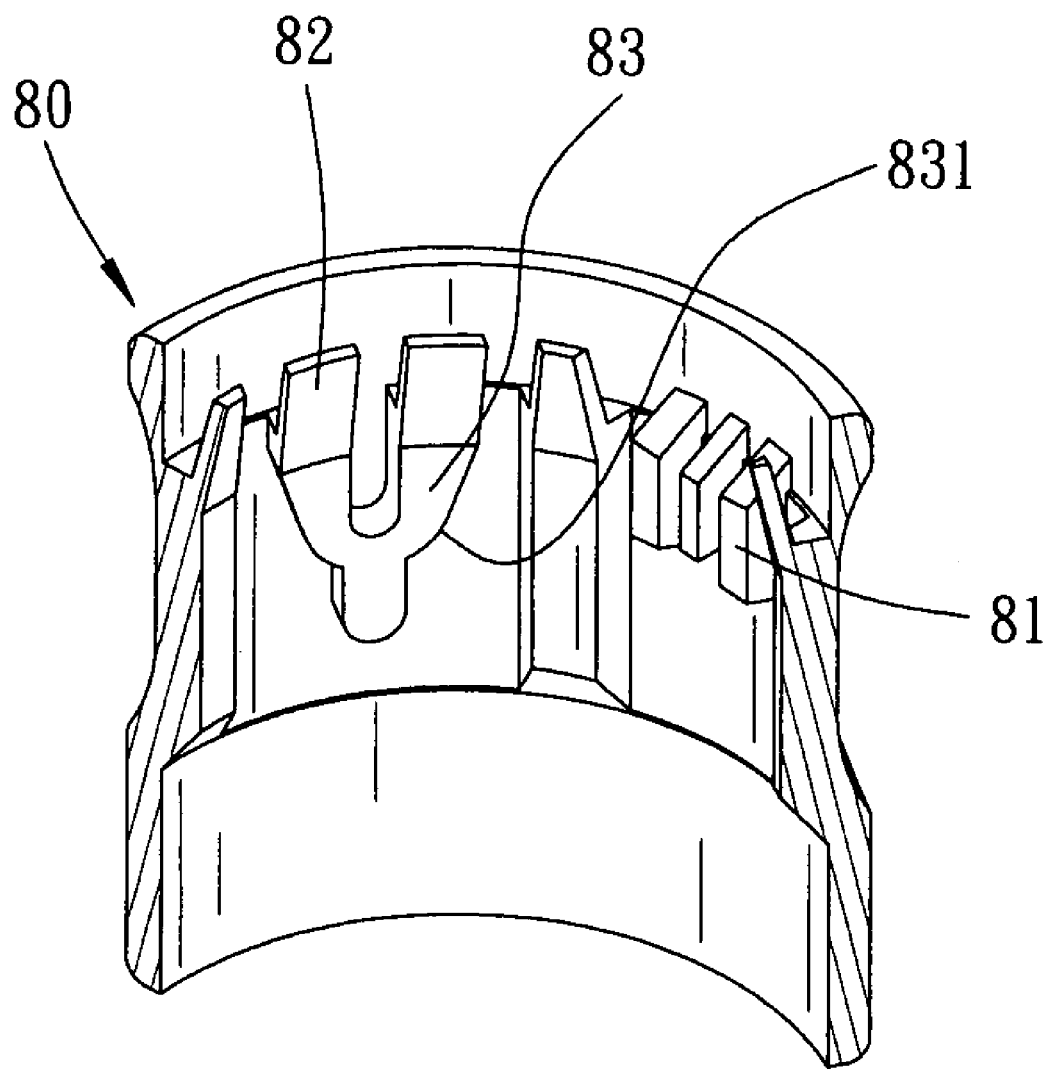
FIG. 4 is a perspective sectional diagram showing a partial portion of the sleeve of the present invention.

Referring to FIG. 3, which is the perspective diagram of the exploded components of the present invention, in company with FIG. 4 at the same time, it is comprised of a tube body 50, a tightening ring 60, resilient retainer 70 and a sleeve 80. The tube body 50 has an open ended flow passage 51 for flow to run through. At the end of the tube body 50 is disposed an externally threaded section with a plurality of axially extended and peripherally disposed flexible clamping dents 52 disposed next thereto so that the tightening ring 60 having an internally defined tapered section 61 can work in cooperation to clamp a tube in place. At the top end of the tube body 50 are peripherally disposed a number of sealing flanges 53. The middle of the tube body 50 is disposed a flat support periphery 54 above which are positioned a plurality of holes 55 with a vertical limiting rib 551 defined at each side thereof. Between every two holes 55 is disposed a horizontal abutment rib 552.

The resilient retainer 70 is integrally made of plastics having a circular ring seat 71 from which upwardly extend a plurality of centrally pointed locking hooks 711 in correspondence to the holes 55 of the tube body 50. A pair of vertical flexible ribs 712 having a expansion space 713 defined therebetween is disposed next to each locking hooks 711 or in an alternating manner. Each locking hook 711 is downwardly in connection to an arc shaped dodge section 714 and a support section 715.

The sleeve 80 is peripherally provided with a plurality of abutment blocks 81 and retaining dents 82 respectively in connection to a push protrusion 83 opposite to the space 713 and having an arc shaped guide face 831, on the inner wall thereof in correspondence to the holes 55 and the sealing flange 53 of the tube body 50. The Y-shaped push protrusion 83 has a pair of prongs provided with the smooth guide face 831 respectively.

Figure 5:
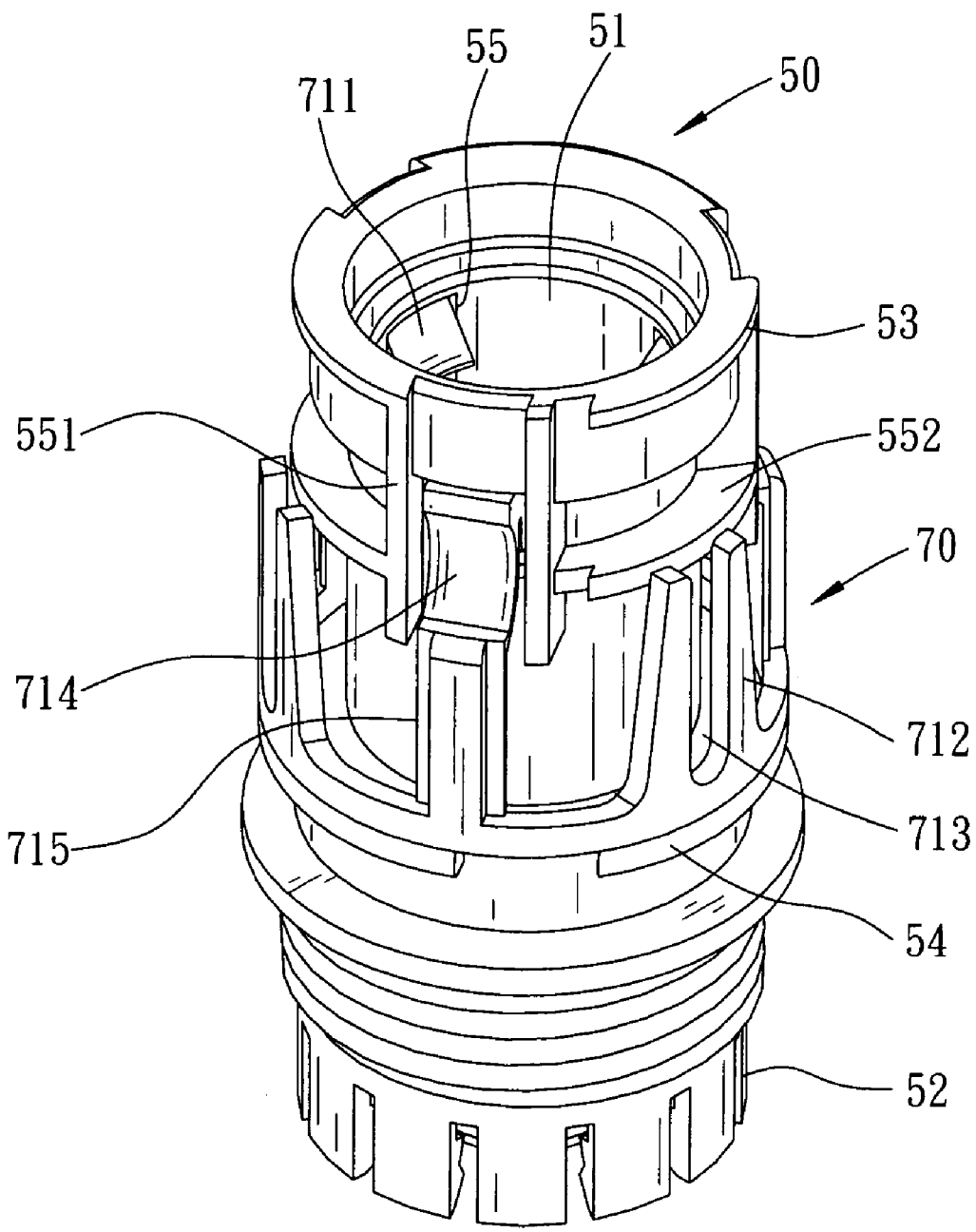
FIG. 5 is a perspective diagram showing the assembly of the resilient retainer and the tube body of the present invention.
Figure 6:
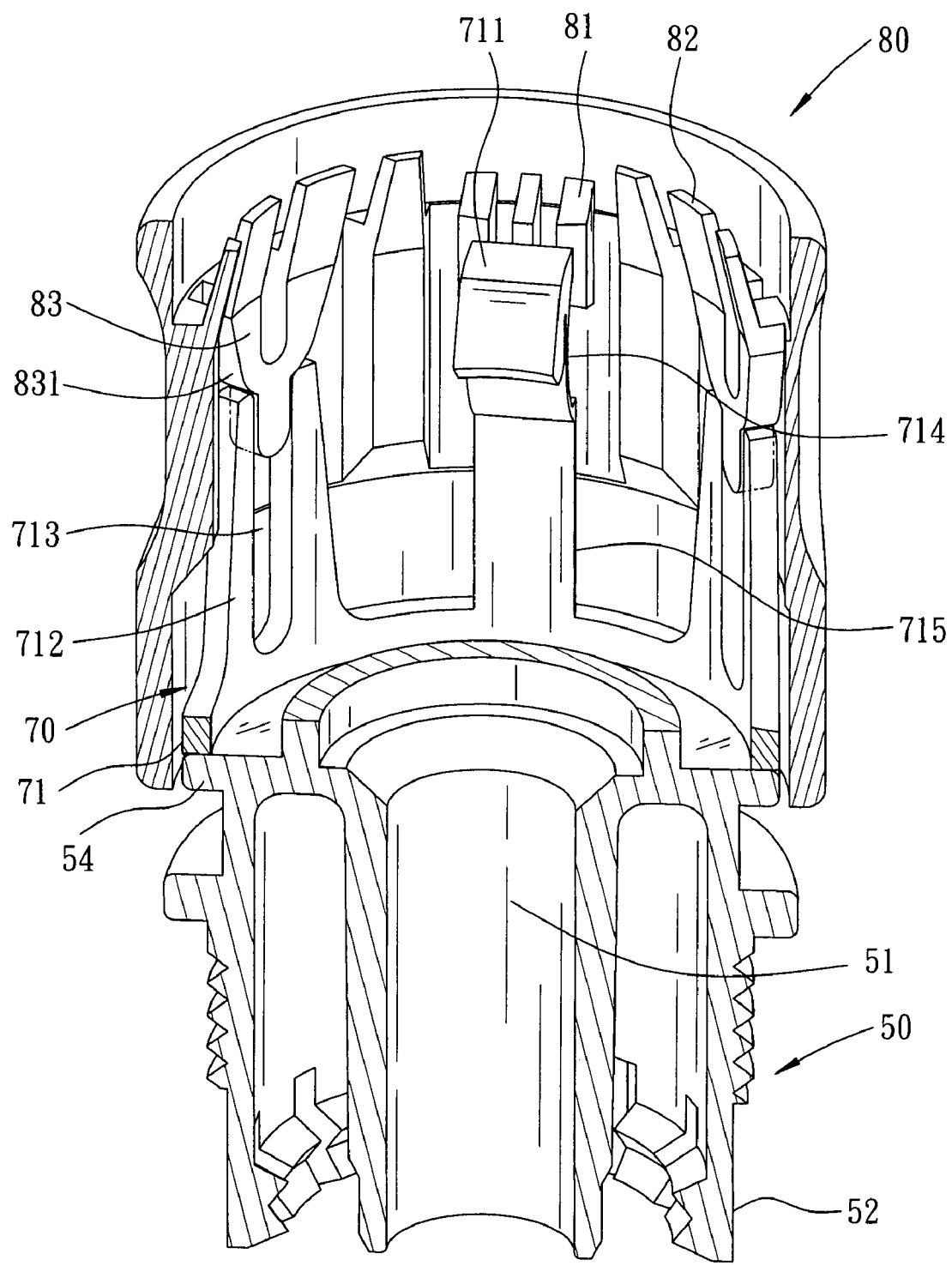
FIG. 6 is one of the sectional diagrams showing the present invention.

In assembly, as shown in FIGS. 5 and 6, the locking hooks 711 of the resilient retainer 70 are first pointed and pushed to engage with the holes 55 from one end of the tube body 50 all the way down till the circular ring 71 in abutment against the support periphery 54, causing the locking hooks 711 just to register with the holes 55 and confined between the vertical limiting ribs 551 respectively in such a manner that the vertical flexible ribs 712 just comes into abutment against the horizontal abutment ribs 552.

Then the abutment blocks 81 of the sleeve 80 are placed in line with the holes 55 so as to permit the sleeve 80 to accommodate the tube body 50 therein with the retaining dents 82 flexibly come into registration with the inner side of the sealing flanges 53 so that the push protrusions 83 just abut against the tips of the flexible ribs 712 and opposite to the expansion space 713. The locking hooks 711 subject to the abutment of the abutment blocks 81 stick into the flow passage 51 to clamp a connecting pipe (not shown in the drawing) in position.

Figure 7:
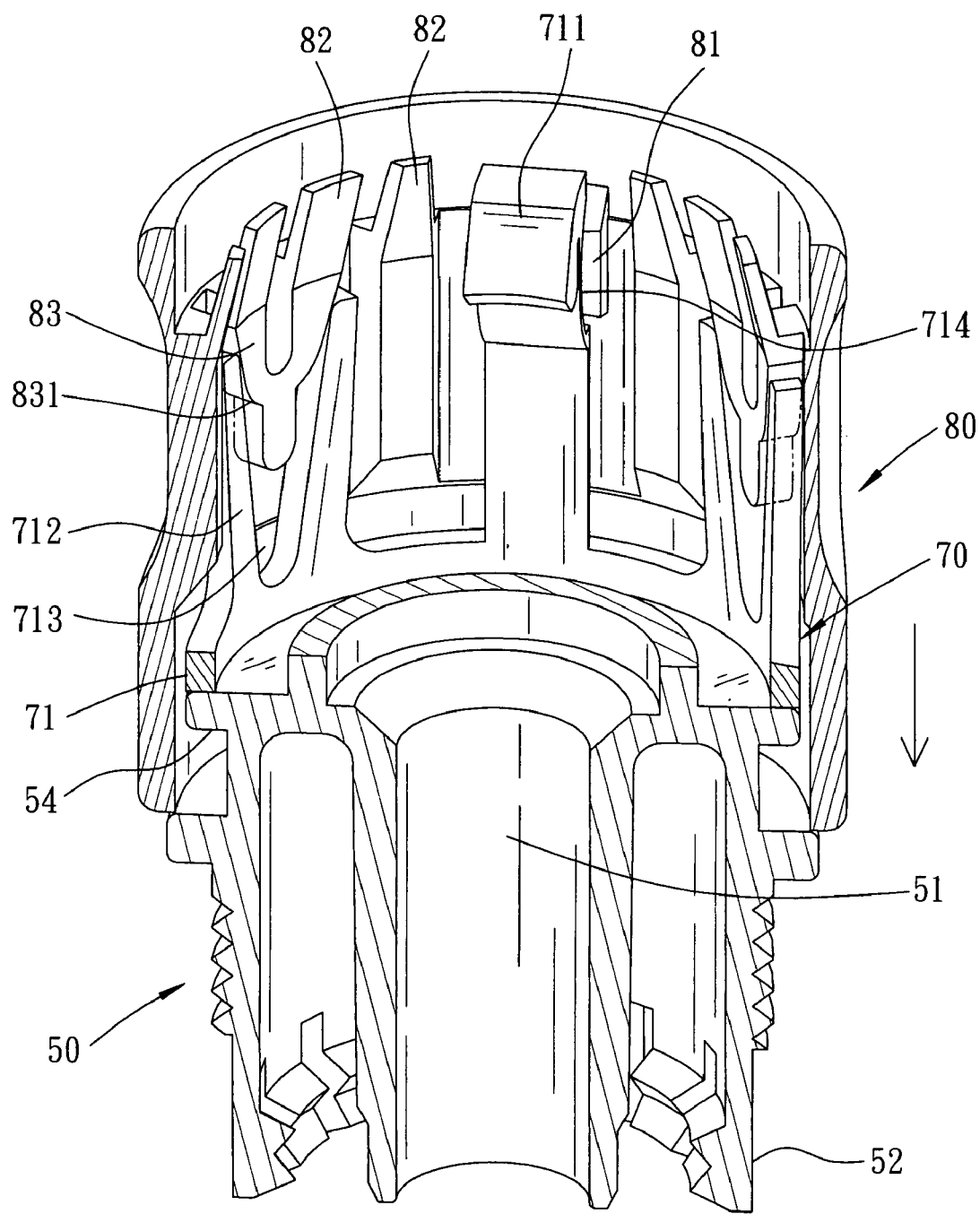
FIG. 7 is a diagram showing the sleeve of FIG. 6 being pushed downwardly.

When the sleeve 80 is pushed downwardly, as shown in FIG. 7, the guide face 831 of the push protrusions 83 will automatically urge the vertical flexible ribs 712 to move aside along the horizontal abutment ribs 552 and fall into registration with the expansion space 713. At the same time the abutment blocks 81 move downwardly into the concave dodge section 714 so as to make the locking hooks 711 free from the abutment of the abutment blocks 81. In the meanwhile, a connecting pipe (not shown) can selectively be removed from or engaged with the flow passage 51 of the tube body 50. Once the sleeve 80 is free of any push, the vertical flexible ribs 712 free of the abutment of the push protrusions 83 will resume their flexibility along the guide face 831 to instantly push the sleeve 80 upwardly to resume its position. This makes the operation easier and smoother and can prevent the elastic parts of the conventional connector from getting stuck due to deformation and elastic fatigue when the sleeve is subject to a pressing force. It makes the operation constantly in an ideal status and saves the cost of using and installation of springs, causing the production of the connects better from an economic stand point and making the product more competitive in the consumer's market.

Figure 8:
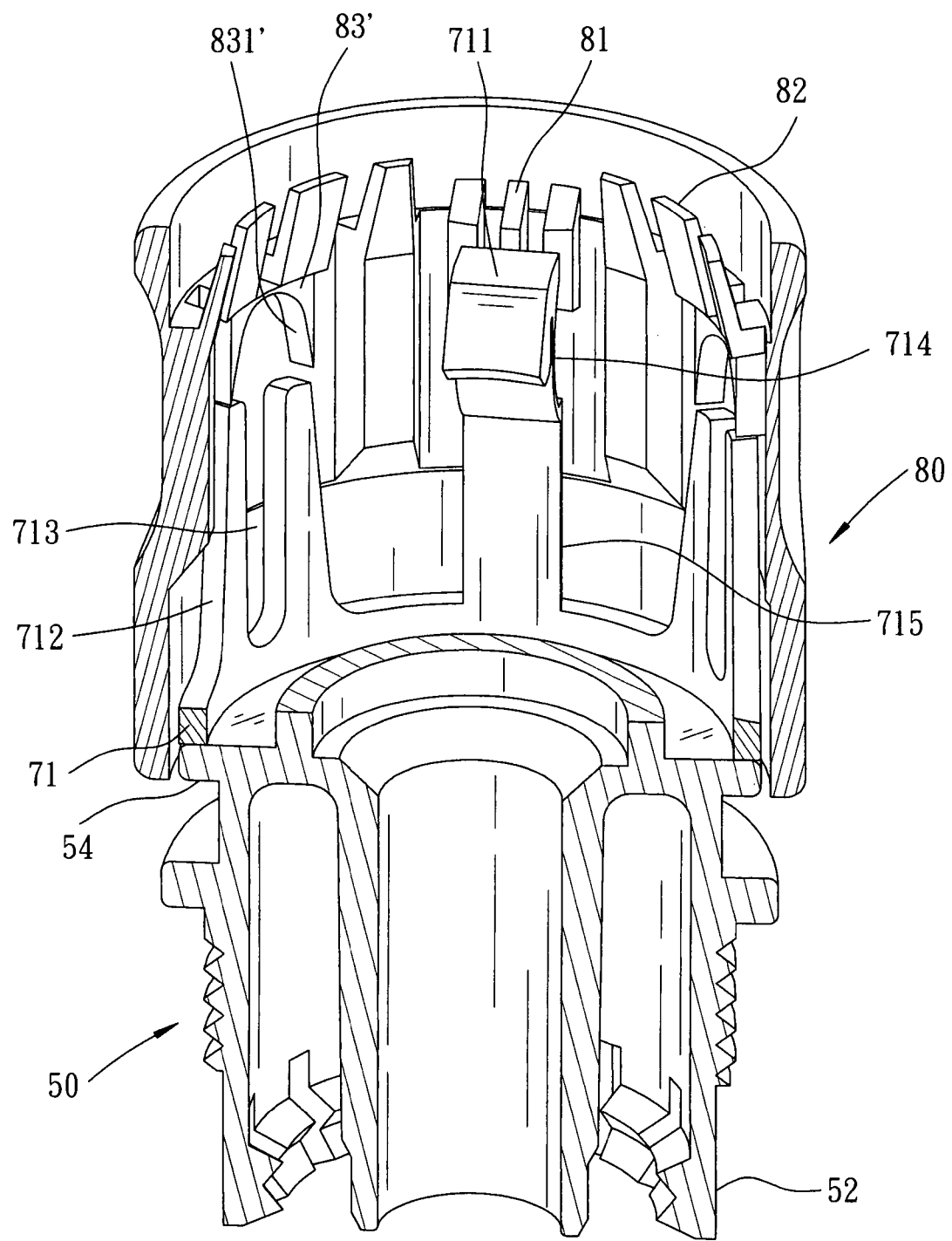
FIG. 8 is another sectional view of the assembly of the present invention.
Figure 9:
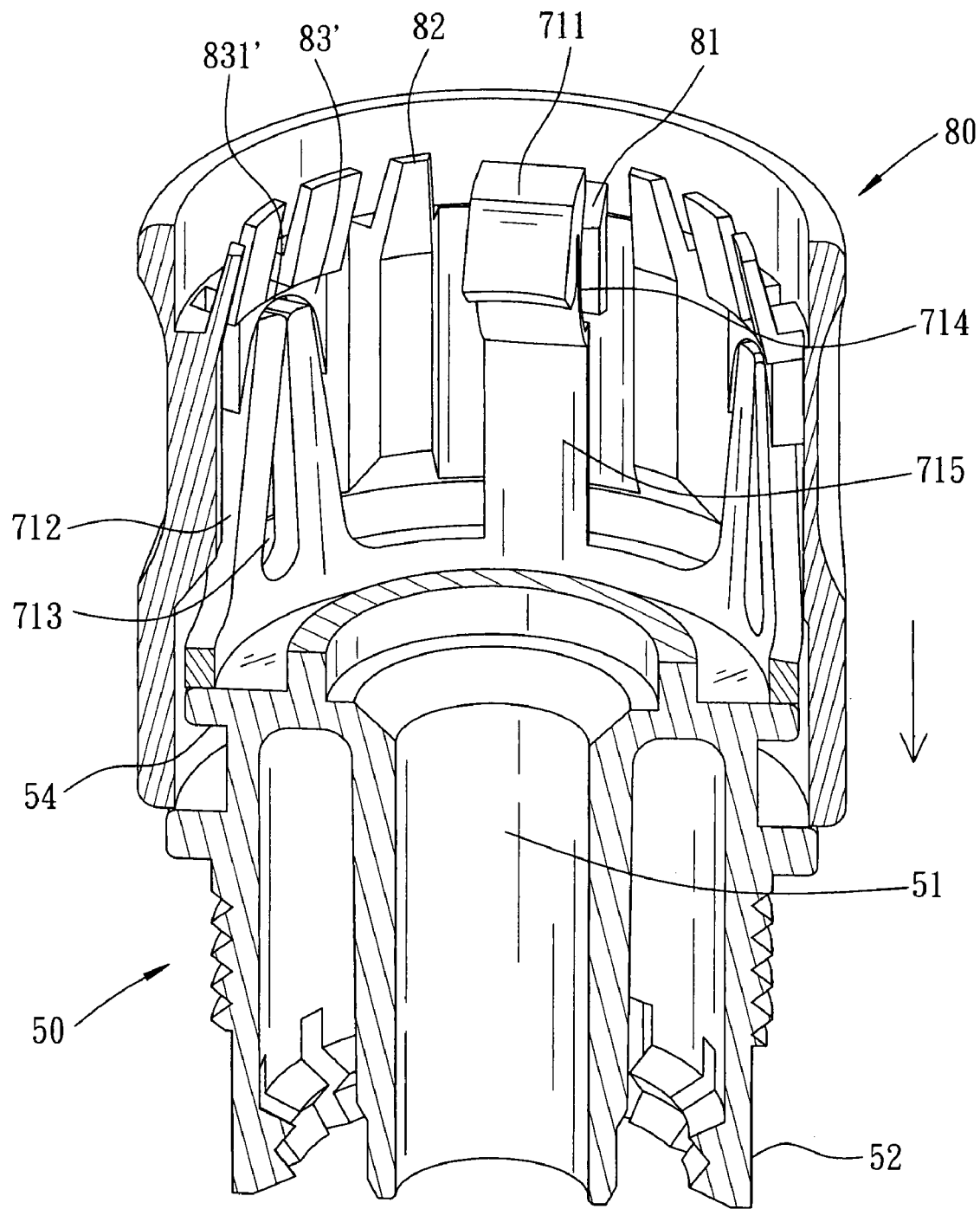
FIG. 9 is a diagram showing the sleeve in FIG. 8 being pushed downwardly.

As shown in FIGS. 8 and 9, in another modified embodiment, the push protrusions 83' of the sleeve 80 is provided with an arch shaped guide face 831' getting narrower from bottom to top so that when the sleeve 80 is pushed downwardly the two flexible ribs 712 will move along the abutment ribs 552 and also under the limit of the guide face 831' and are forced to bend toward the expansion space 713 and are restrained by the guide face 831'. As soon as the sleeve 80 is free of being pressed, the flexible ribs 712 are released from the bondage of the guide face 831' and will bounce back outwardly and instantly push the sleeve 80 upwardly into another operation mode.

Figure 10:
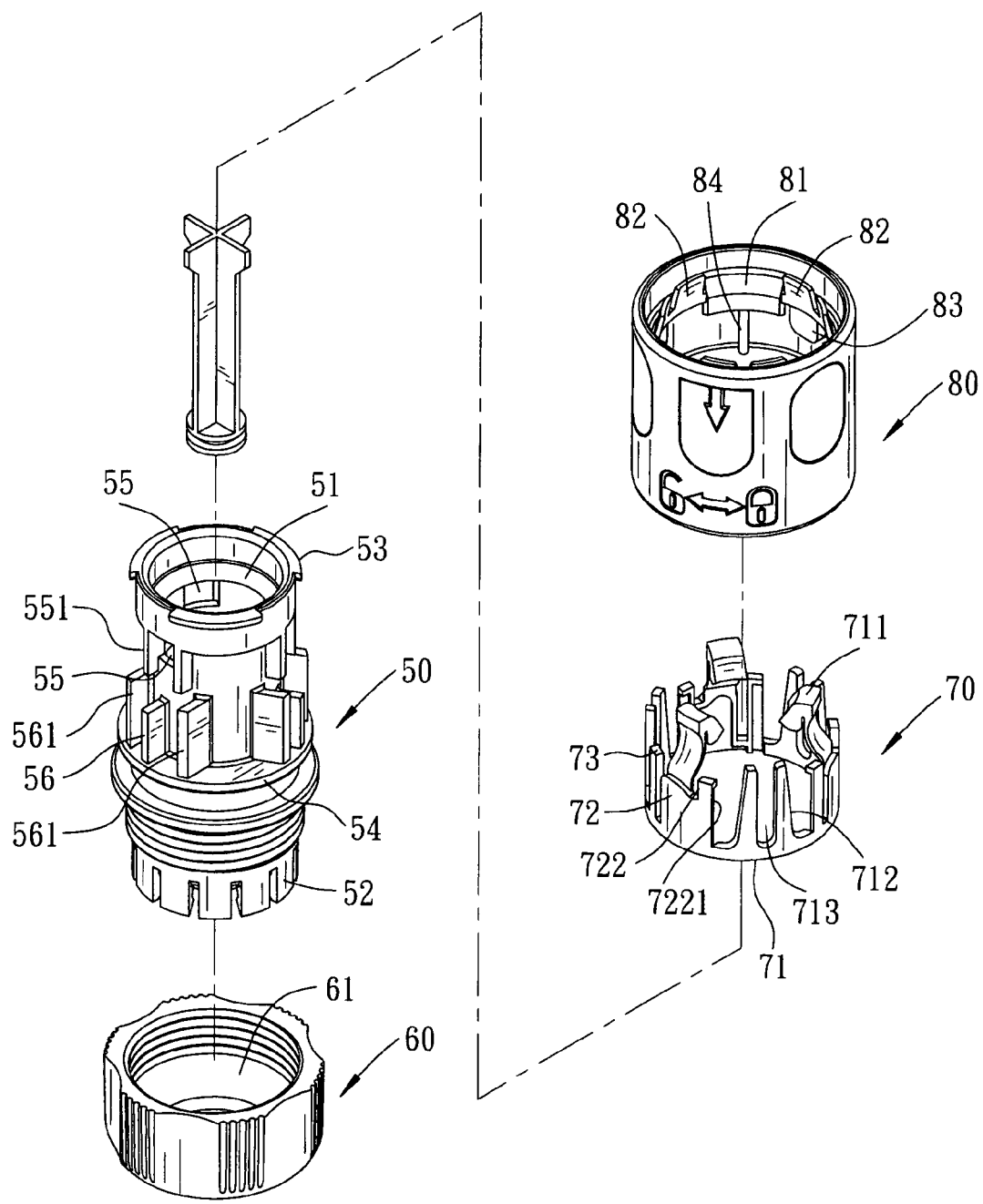
FIG. 10 is another perspective diagram showing the exploded components of the present invention.
Figure 11:
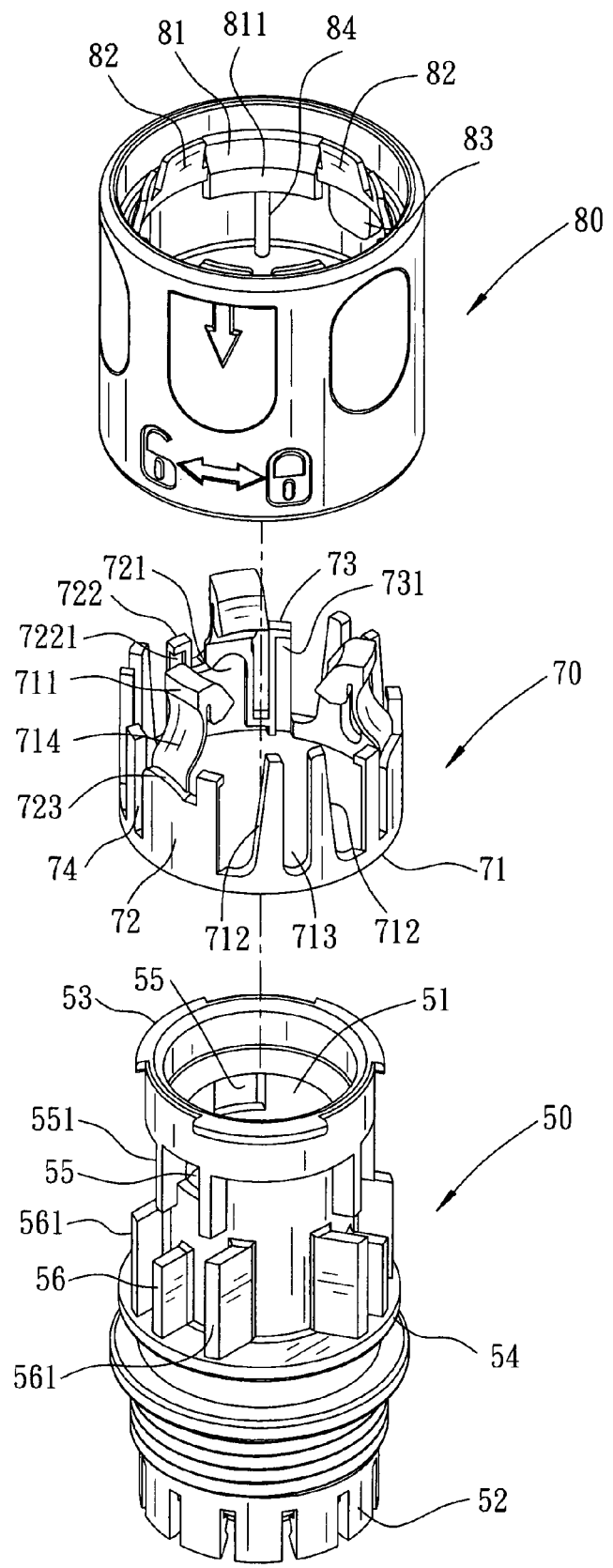
FIG. 11 is a perspective diagram showing the exploded components of the enlarged diagram of FIG. 10.
Figure 12:
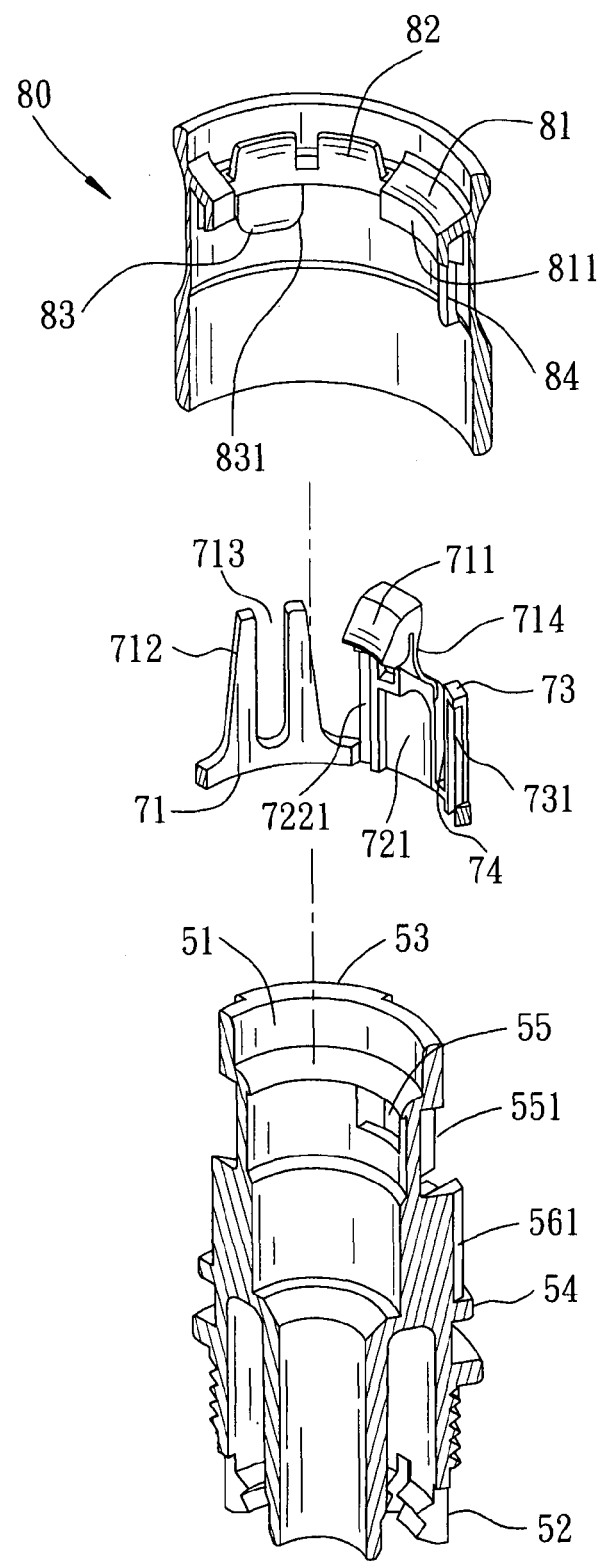
FIG. 12 is a sectional diagram showing the sleeve, the resilient retainer and the tube body of the FIG. 11.
Figure 13:
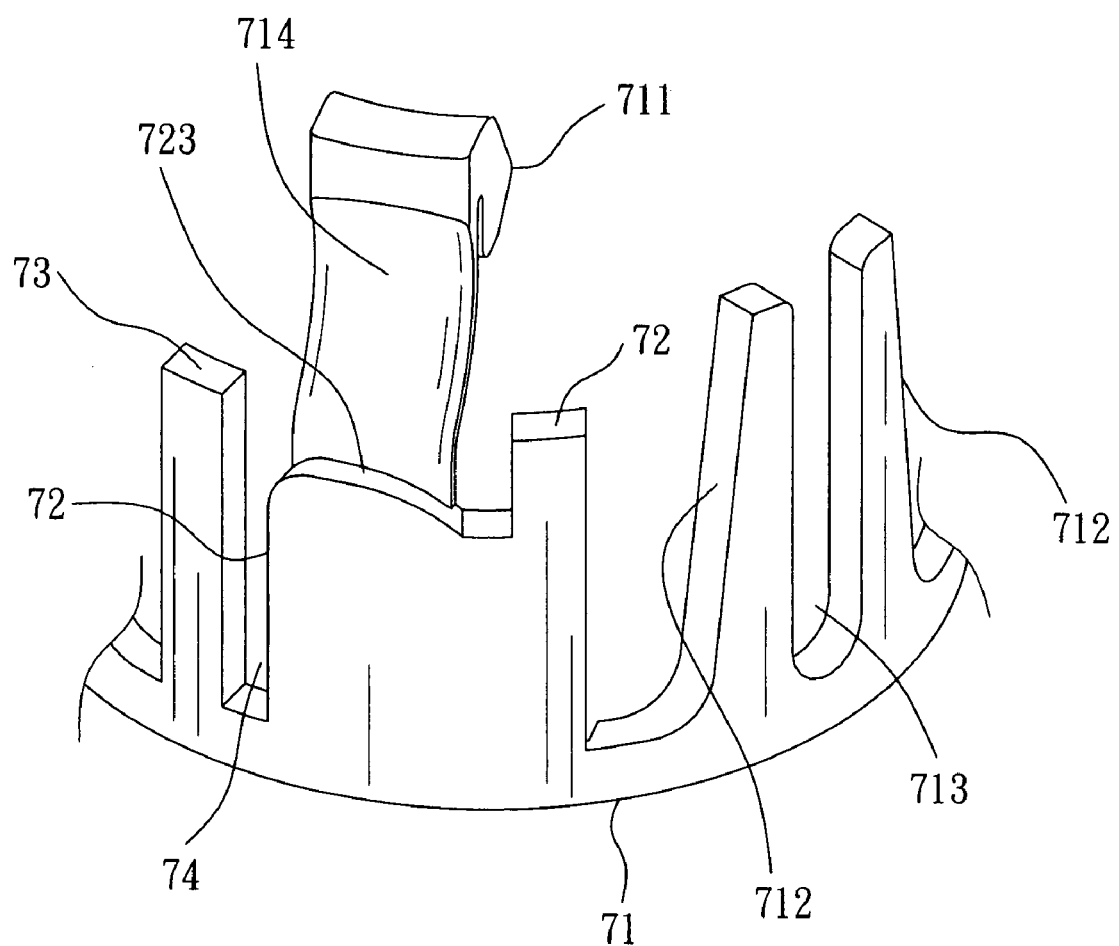
FIG. 13 is a perspective sectional diagram of the resilient retainer of FIG. 11.
Figure 14:
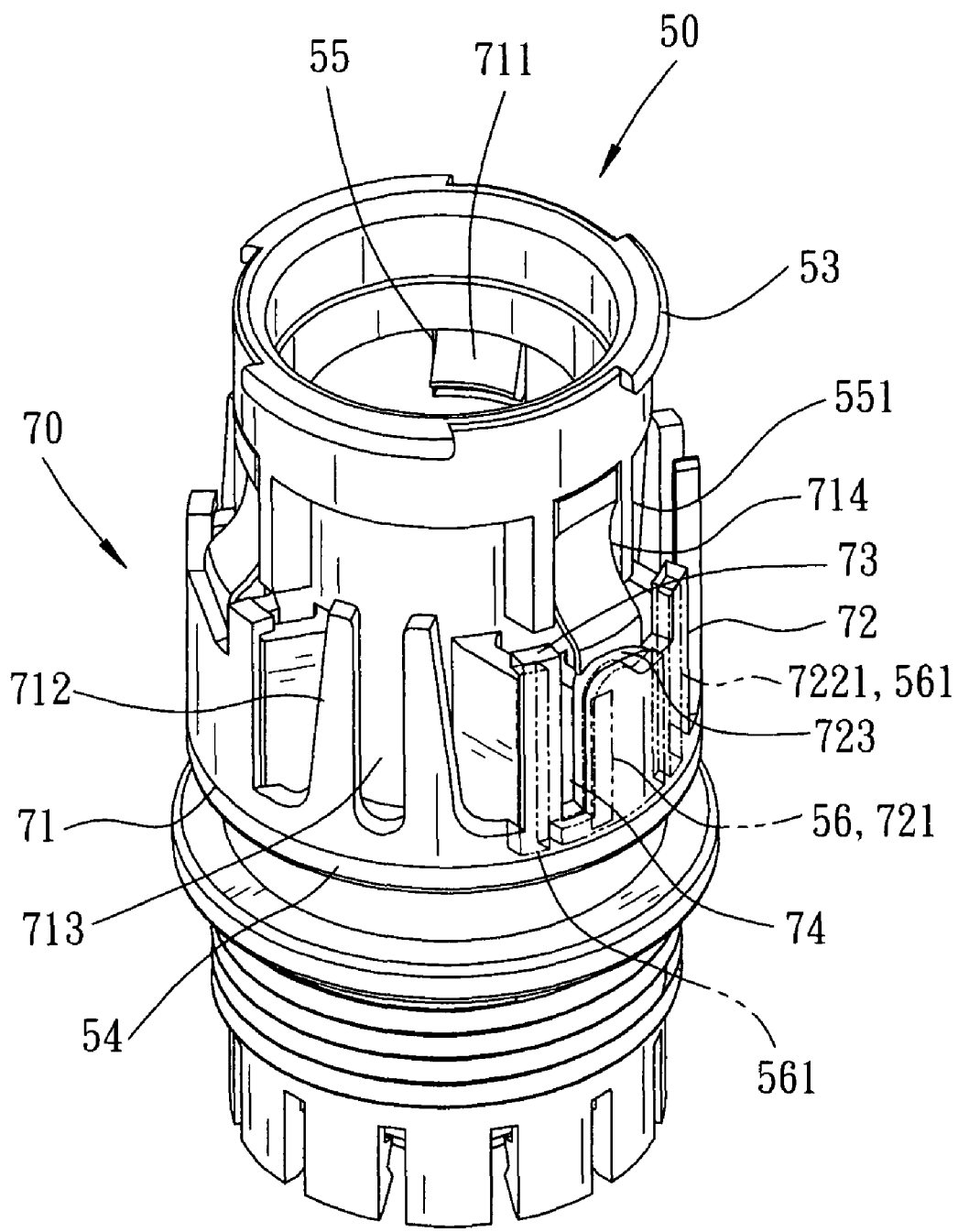
FIG. 14 is a perspective diagram showing the assembly of the resilient retainer and the tube body shown in FIG. 11.
Figure 15:
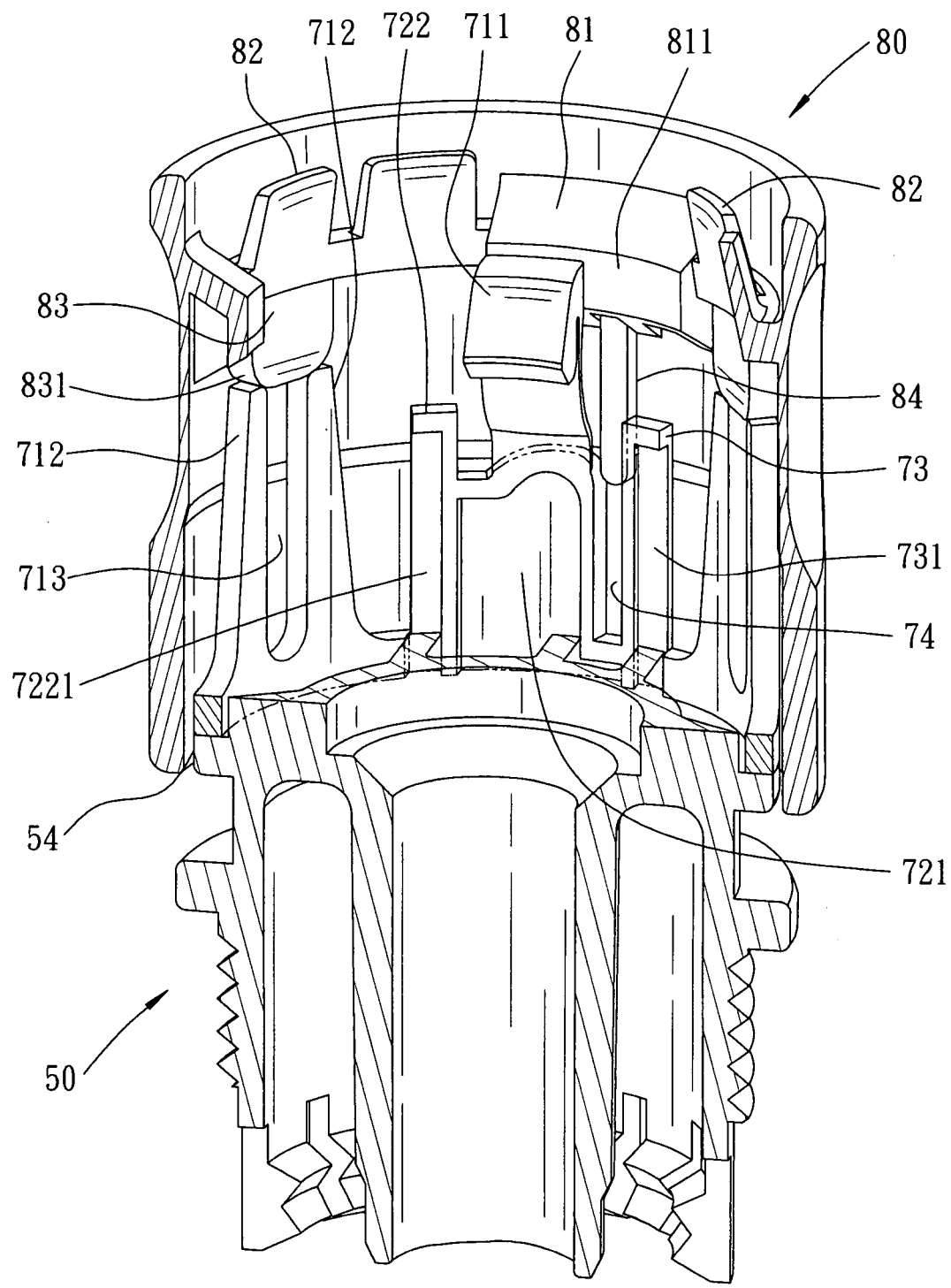
FIG. 15 is a first sectional diagram showing the assembly of the sleeve and the resilient retainer of FIG. 11.
Figure 16:
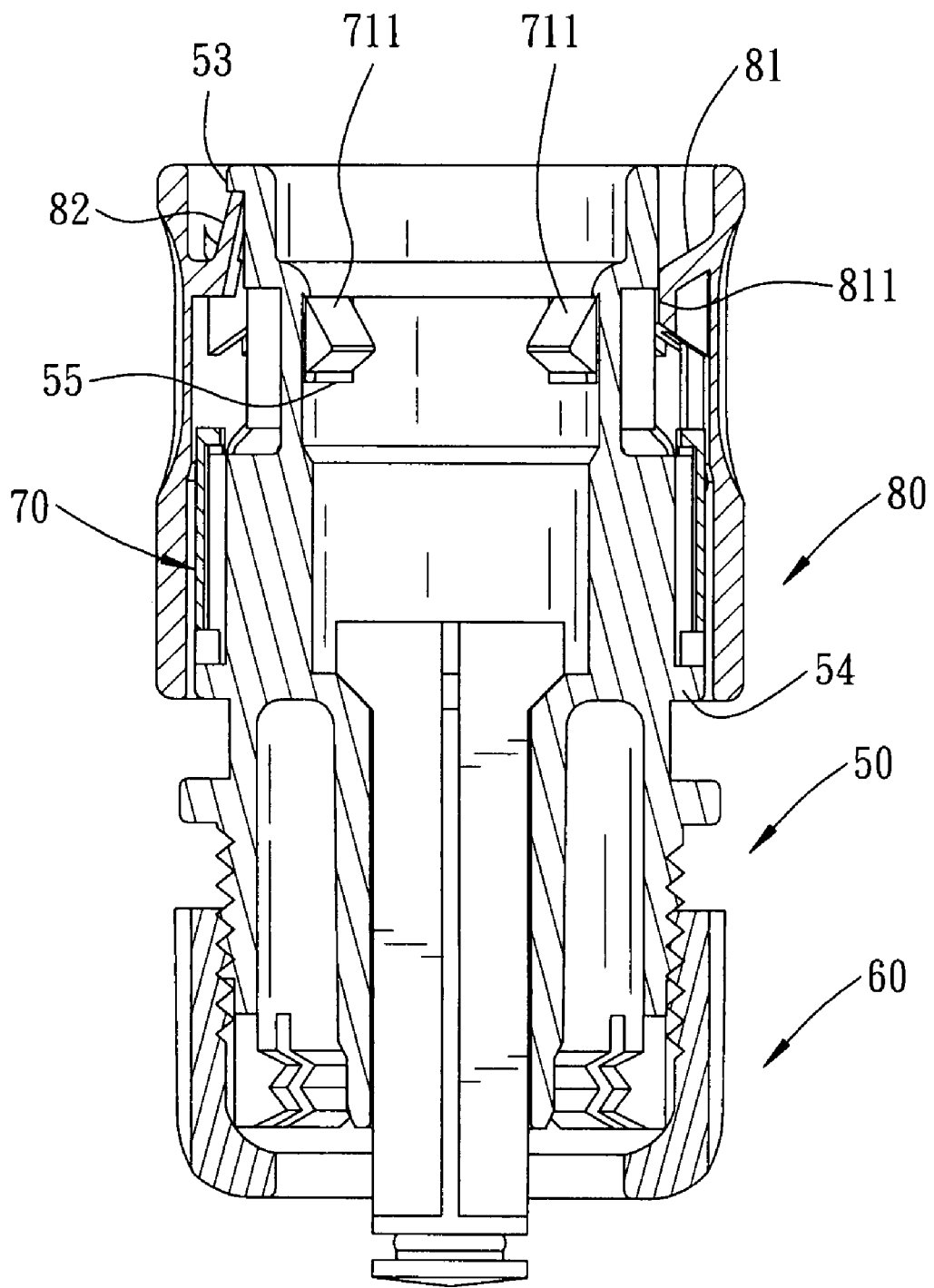
FIG. 16 is a second sectional diagram of the assembly of FIG. 11.
Figure 17:
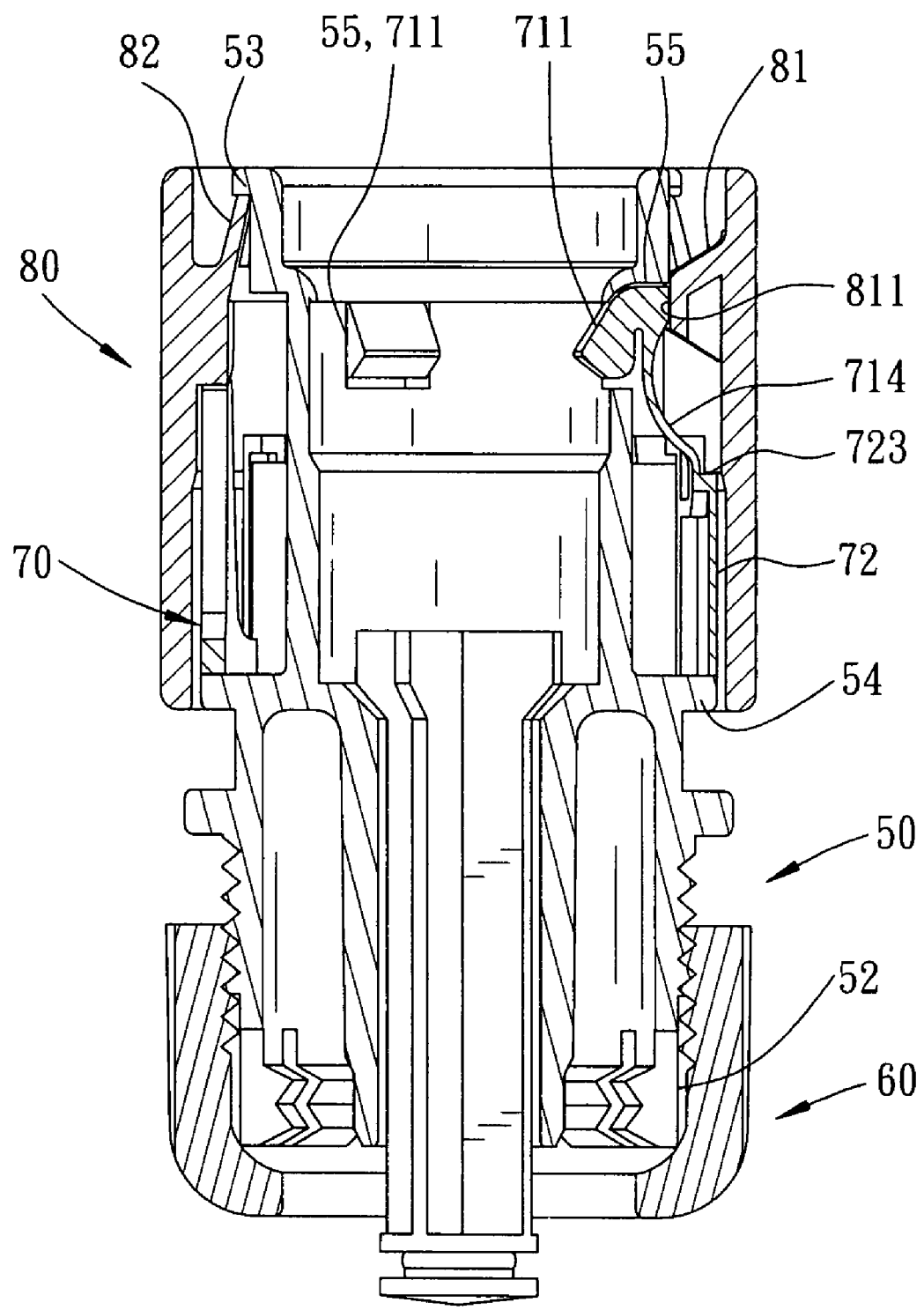
FIG. 17 is a third sectional diagram of the assembly of FIG. 11.

Referring to FIG. 10, the perspective diagram of the exploded components of another embodiment of the present invention are illustrated, and also referring to FIG. 11 to FIG. 13, the tube body 50 is equipped with a plurality of support blocks 56 in linear alignment with the holes 55 disposed right thereabove. At each side of the support block 56 is disposed an engagement block 561 and a stop block disposed at each side of the hole 55 is positioned just between one support block 56 and one engagement block 551 respectively. Under each dodge section 714 of the resilient retainer 70 is disposed a support wall 72 on the inner side of which is defined a cavity section 721 positioned in registration with one support block 56 respectively. At the right side of the support wall 72 extends upwardly a stop post 722 defined in a reverse L shape and at the left side is disposed a spaced restraint post 73 so as to form a guide opening 74. The stop post 722 and restraint post 73 are flush with each other and are provided with a registration cavity 7221 and 731 respectively. A slide slope 723 starting from the stop post 722 toward the guide opening 74 is defined at a lower level on the support wall 72. The dodge section 714 of the locking hook 711 starts from the inner side of the slide slope and extends upwardly.

The abutment blocks 81 of the sleeve 80 have a smoothly sloped surface extending downwardly in connection to an arc contact plane 811. At the bottom of each abutment block 81 is disposed a vertical guide post 84 in alignment with the guiding opening 74 of the resilient retainer 70. The push protrusion 83 has a pair of smoothly processed guide corners 831 at the bottom thereof.

Referring to Figures from FIG. 14 to FIG. 17, the locking hooks 711 of the resilient retainer 70 are first placed in alignment with the holes 55 of the tube body 50 so that the resilient retainer 70 can be forced into engagement with the tube body 50 from one end thereof with the circular ring 71 lies in contact with the support periphery 54. In such a manner, the locking hooks 711 are just in locking engagement with the holes 55 and confined in the two limiting ribs 551 at both sides thereof and the cavity section 721 at the inner side of each support wall 72 just leans against the support blocks 56 so as to build a reinforced support on purpose. In the meanwhile, the engagement block 561 at two sides, the stop post 722 and the registration cavity 7221 and the registration cavity 731 of each restraint post 73 are mutually engaged with one another so as to form a built up support, making the resilient retainer 70 actually work as a control and positioning component. Then, the abutment blocks 81 of the sleeve 80 are lined in alignment with the holes 55 so as to permit the tube body 50 to be forced into engagement with the sleeve 80 with the retaining dents 82 resiliently engaged with the inner side of the sealing flanges 53. Thus the push protrusions 83 are just in abutment against the top end of the vertical flexible ribs 712 and in face to the expansion space 713 and the guide posts 84 are just opposite to the guide opening 74 and limited by the stop post 722. The locking hooks 711 are subject to the abutment of the contact planes 811 of the abutment blocks 81 and stick into the flow passage 51 of the tube body 50 to clamp a connecting pipe (not shown in the diagrams) in place.

Figure 18:
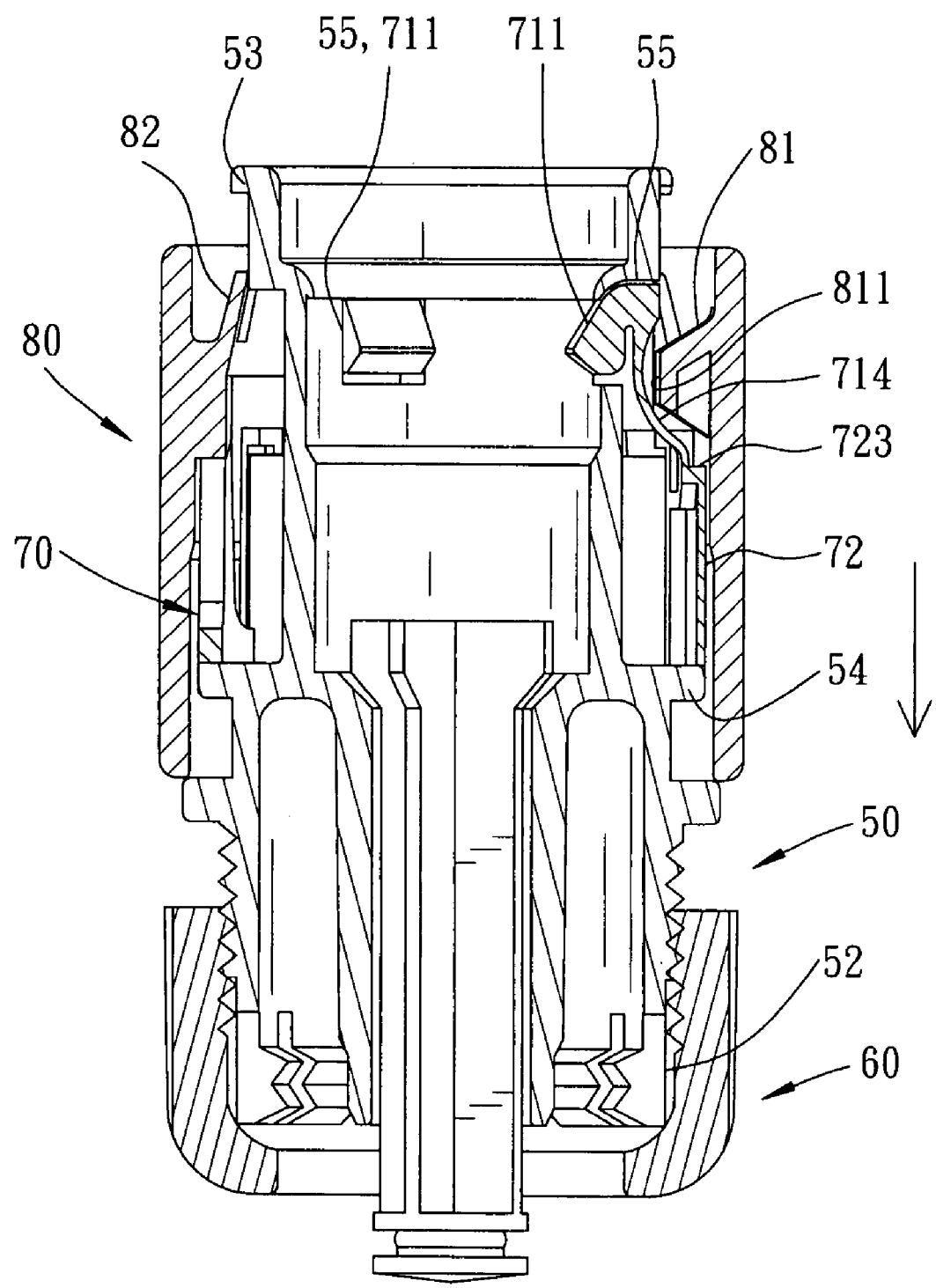
FIG. 18 is a diagram showing the sleeve in FIG. 11 being pushed downwardly.
Figure 19:
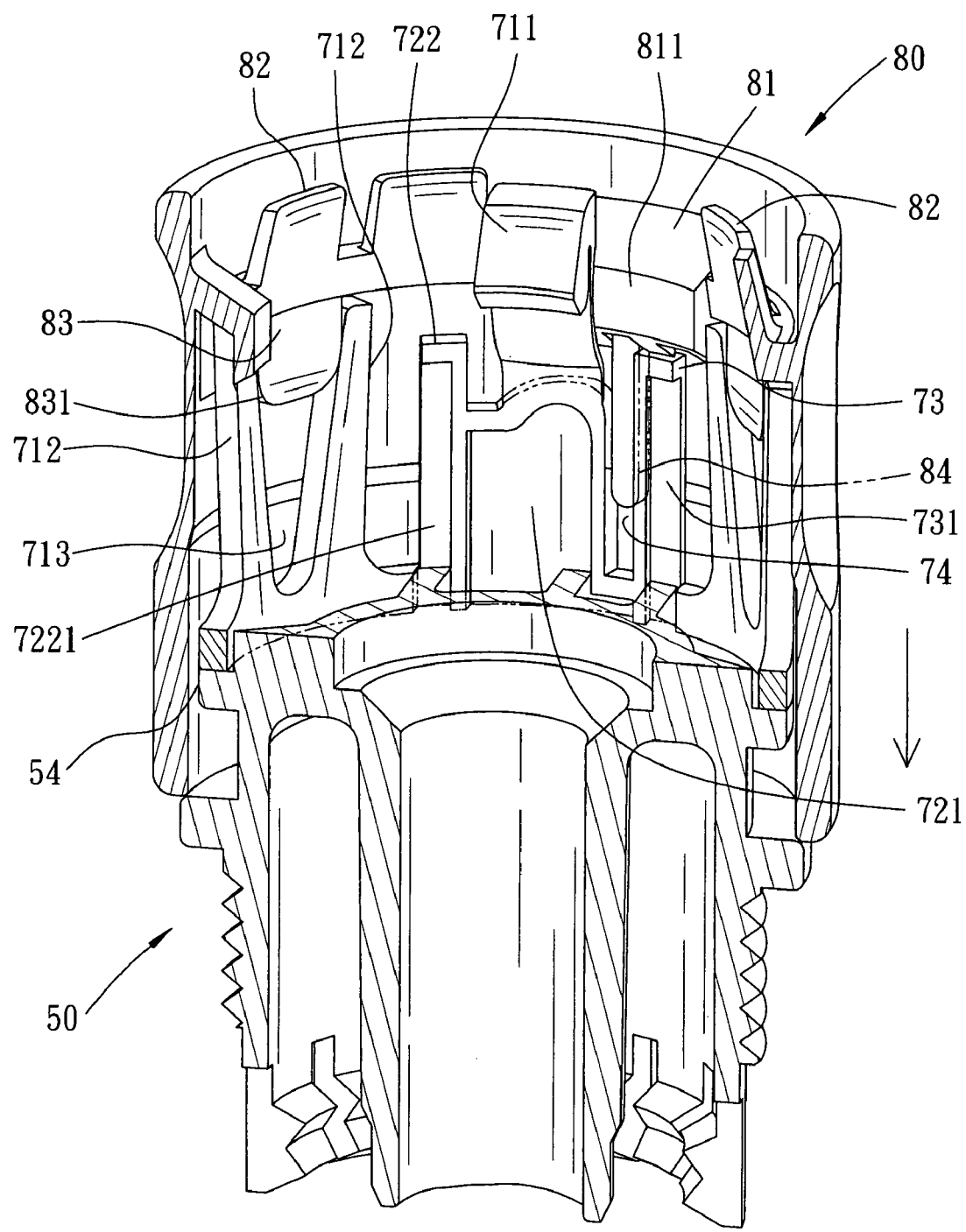
FIG. 19 is another diagram showing the sleeve in FIG. 11 being pushed downwardly.

When the guide posts 84 of the sleeve 80 are forced downwardly along the guide opening 74 of the resilient retainer 70, as shown in FIG. 18 and FIG. 19, the guide corners 831 of the push protrusions 83 will push the vertical flexible ribs 712 aside and slide into the expansion spaces 713 respectively, and at the same time, the abutment blocks 81 are forced to move downwardly into the dodge section 714 so as to set the locking hooks 711 free of the abutment of the contact planes 811. Now, a connecting pipe can be inserted into or removed from the flow passage 51 of the tube body 50. Once the sleeve 80 is released from a push, the vertical flexible ribs 712 free of the abutments of the push protrusions 83 will produce a reactive force along the guide corners 831 to push the guide posts 84 and the abutment blocks 81 of the sleeve 80 upwardly to get them resumed of their original positions. Such a mechanism makes the operation smoother and easier. It can prevent the conventional resilient parts from getting stuck due to deformation and fatigue of resilience in operation when the sleeve is forced downwardly. Moreover, the resilient retainer 70 makes use of the inner cavity section 721 and the stop face 722 of each support wall 72 and the registration cavity 7221 and 731 of each restraint post 73 are respectively supported by the support block 56 and the engagement block 561 respectively so that reinforced supports are obtained when the sleeve 80 is subject to a downward push, making the resilient retainer 70 built up and durable and subject to greater force without easy damage. It can also cut the production cost by non use of spring components and saving the labor of assembly, making the product of present invention more competitive in markets.

Figure 20:
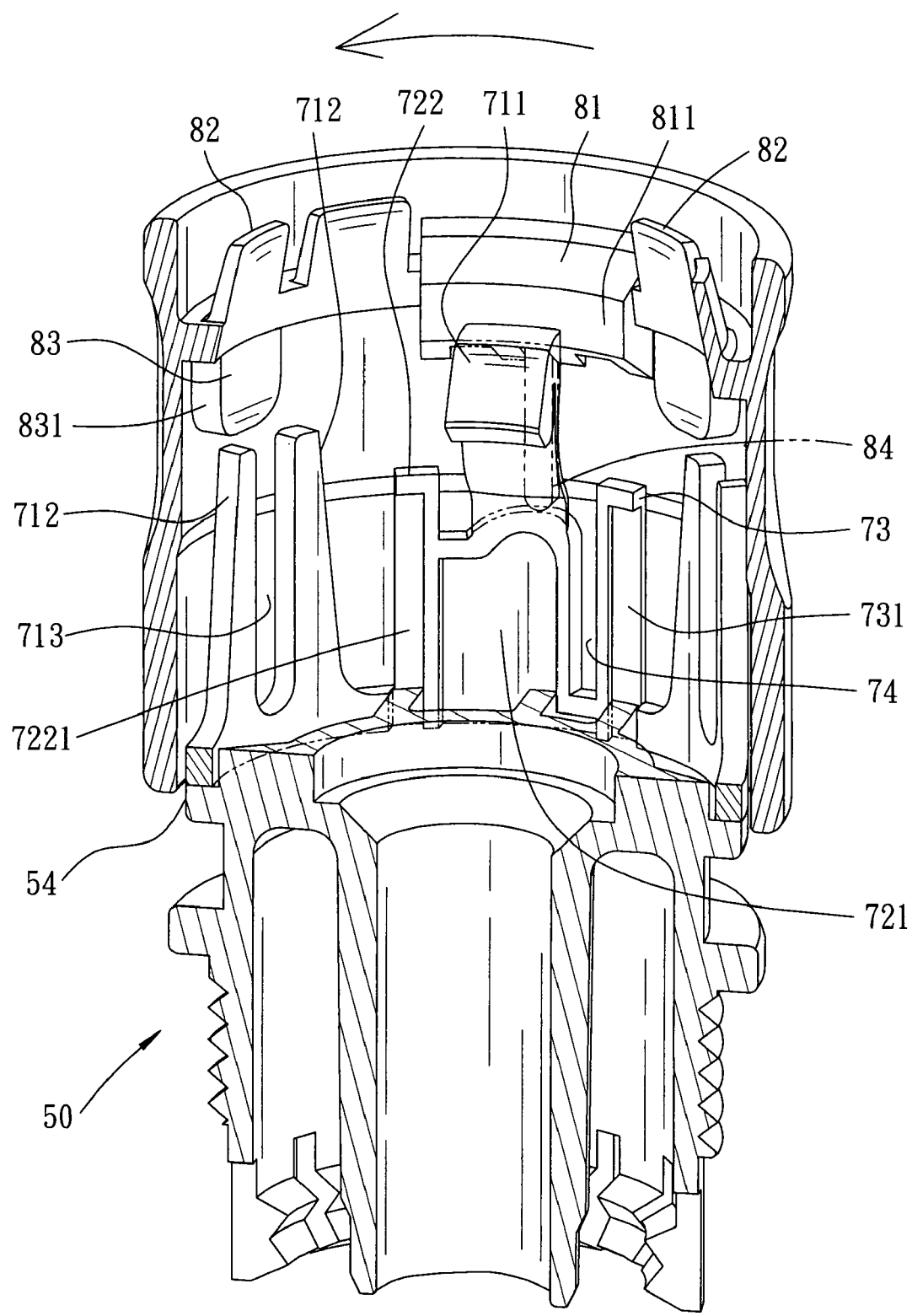
FIG. 20 is a diagram showing the guide posts of FIG. 11 sliding along the slide slopes of the resilient retainer.
Figure 21:
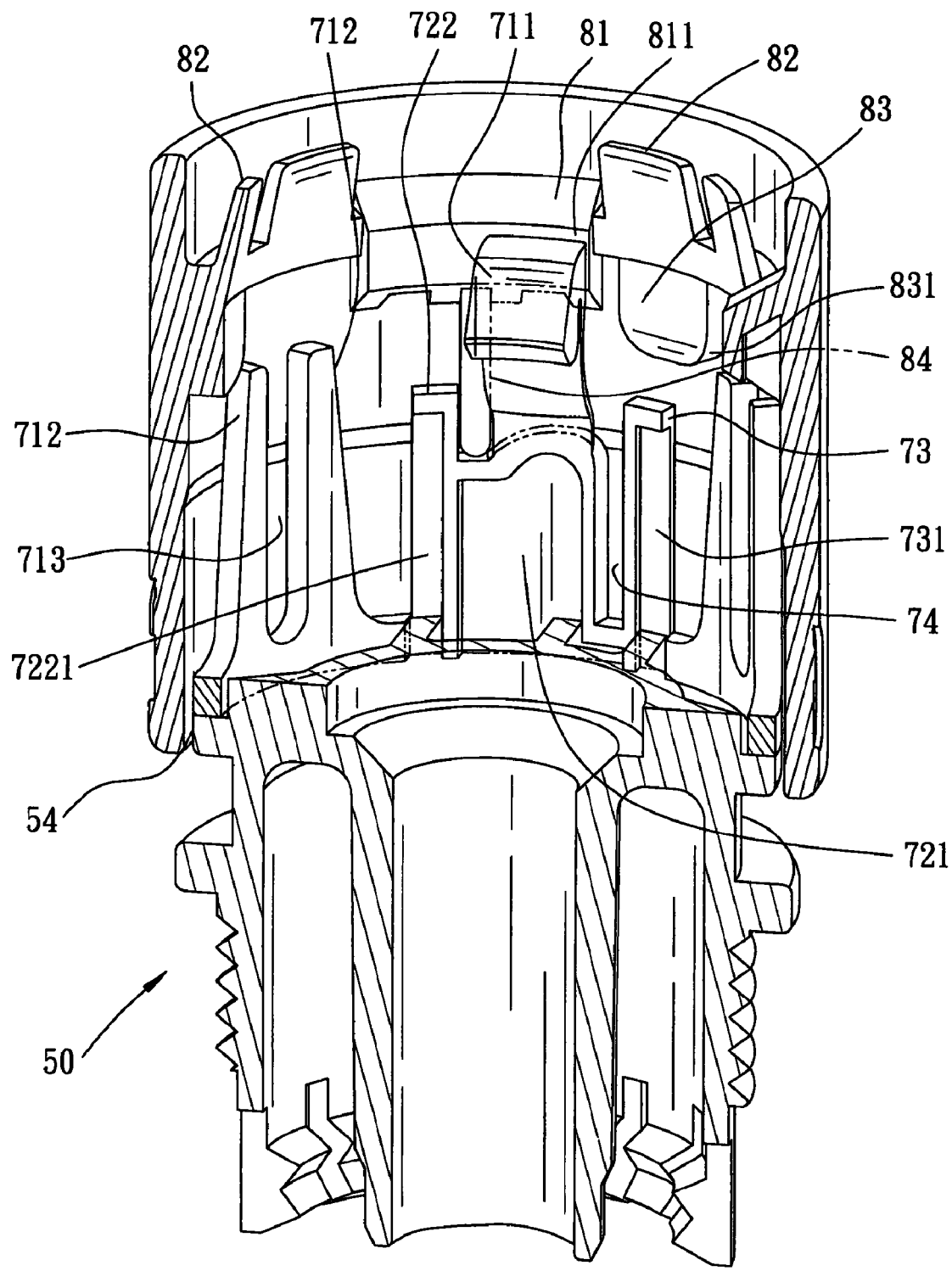
FIG. 21 is a diagram showing the guide posts of the sleeve in FIG. 11 sliding along slide slopes of the resilient retainer and being stopped in place.

As shown in FIGS. 20 and 21, when water is sprinkled, the guide post 84 moves from the restraint post 73 along the slide slope 723 to the stop face 722, and then the sleeve 80 can not be pushed further downwardly and held in position with the help of the restraint of the guide post 84 and the stop face 722. In such a manner, the sleeve 80 can not be pushed downwardly in operation by accident so as to prevent a connecting pip from instant disengagement by great water pressure, resulting in getting people around splashed wet. At the same time, the engagement blocks 561 of the tube body 50 are engaged with the registration cavity 7221 and 731 of each restraint post 73 so as to prevent the resilient retainer 70 from rotation along with the spinning of the sleeve 80, making the control and fixing in a more accurate manner.

Figure 22:
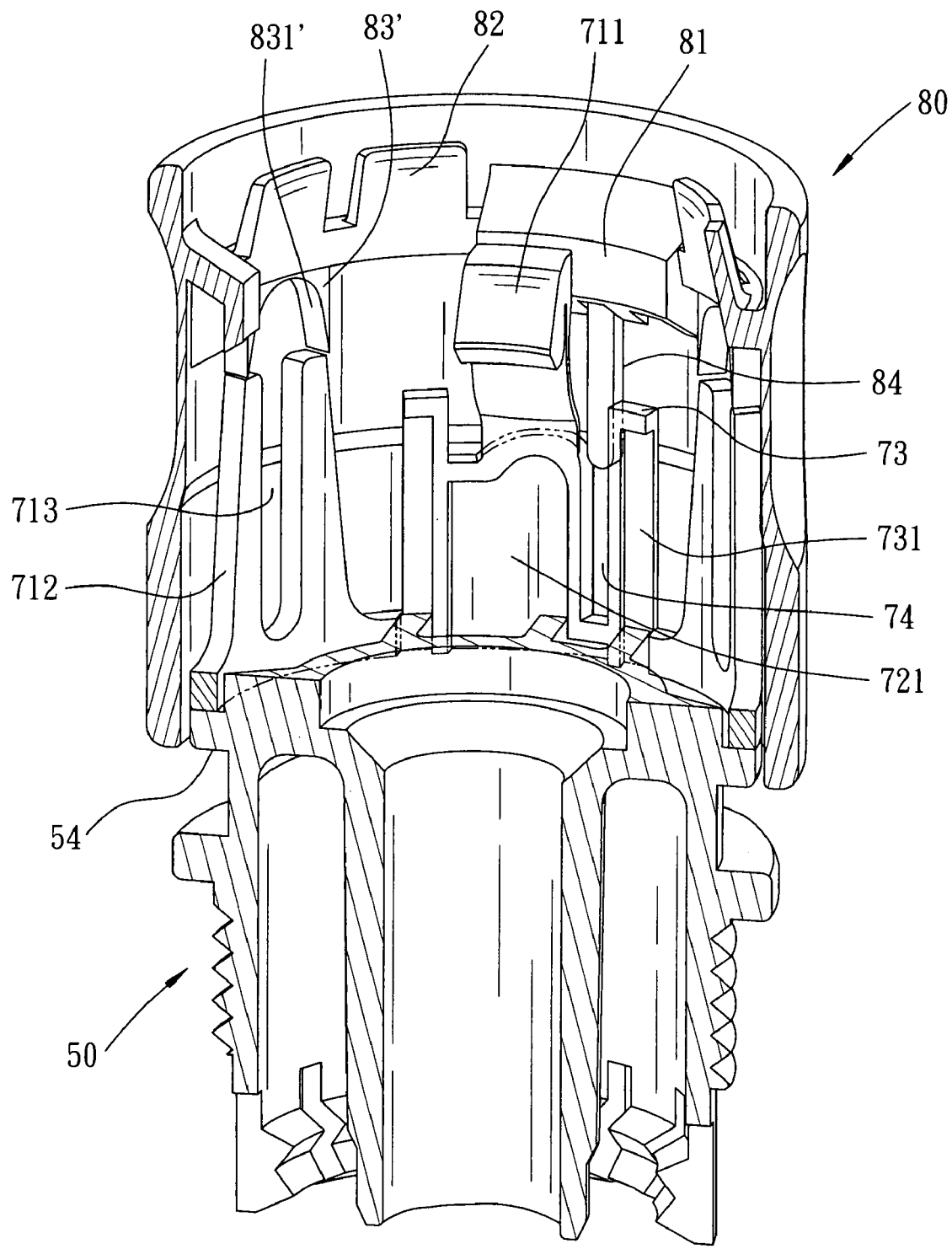
FIG. 22 is a fourth sectional diagram of FIG. 11.
Figure 23:
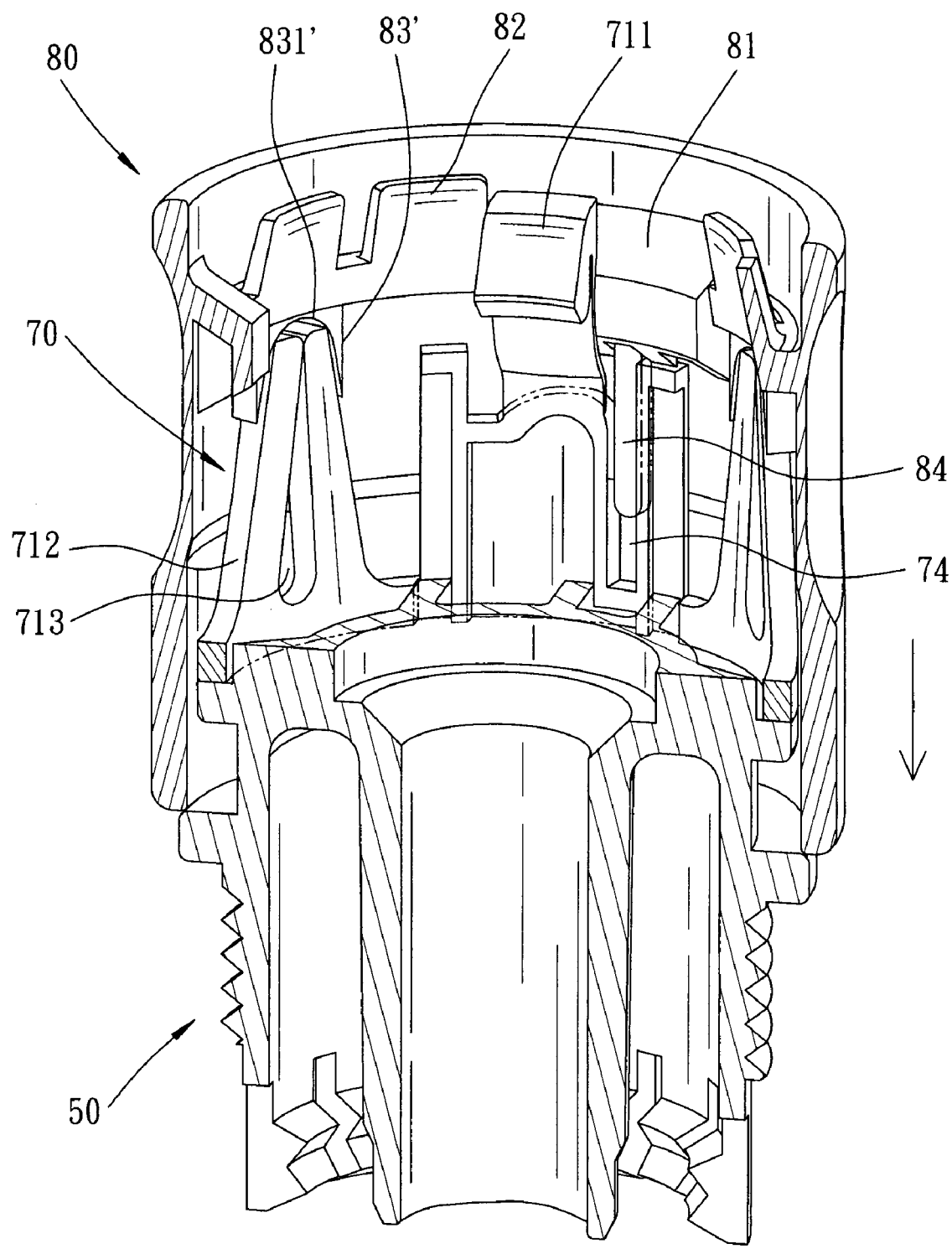
FIG. 23 is a diagram showing the sleeve of FIG. 22 being pushed downwardly.

Referring to FIG. 22 and FIG. 23, the sleeve 80 has an arch push protrusion 83' having a guide face 831' becoming narrower from the bottom to the top. When the sleeve 80 is pushed downwardly, the two vertical flexible ribs 712 will move along the guide face 831' and are bent to fit into the expansion space 713 and are limited by the guide face 831'. Once the sleeve 80 is free of an exerted force, the two flexible ribs 712 confined in each expansion space 713 will produce an reactive force to expand outwardly to instantly push the sleeve upwardly to resume its another operation mode.

We claim:

1. A fluid connector for garden use, comprising:
   a tube body, said tube body including an interior space for flow passage, an exterior surface, and a support periphery perpendicular to the exterior surface, said exterior surface including a plurality of holes thereon;
   a resilient retainer being fitted on the exterior surface of the tube body, said resilient retainer including a seat, said seat including one or more locking hooks extended upwardly therefrom and said seat including one or more pairs of vertically flexible ribs, in an original state, disposed at a periphery of the seat, each of said one or more locking hooks being able to engage with one of the plurality of holes of the tube body, each of said pairs of vertically flexible ribs being joined on the seat and defining an expansion space between ribs in each pair, said expansion space permitting the ribs in a pair to flexibly move toward and away from each other, said each of said pairs of vertically flexible ribs is disposed on the seat next to one of the one or more locking hooks in an alternating manner; and
   a sleeve including an inner wall, said inner wall including a plurality of abutment blocks and a plurality of push protrusions, each of said plurality of push protrusions being positioned in alignment with one of said pairs of vertically flexible ribs, wherein, as said sleeve is pushed toward a direction to engage with said resilient retainer, said one or more locking hooks of the resilient retainer engage the plurality of holes of the tube body and said pairs of vertically flexible ribs engage with the plurality of push protrusions as the vertically flexible ribs are forced to deform and produce a reactive force responsive to engaging with the plurality of push protrusions, and wherein the pairs of vertically flexible ribs return to the original state when said sleeve is free from an external force exerting thereon;

wherein said one or more locking hooks and the one or more pairs of vertically flexible ribs are made integrally with said resilient retainer;

wherein each said one or more locking hooks of said resilient retainer is coupled with an arc shaped support section having a dodge section defined thereon;

wherein said resilient retainer further comprises a plurality of flat support walls under each dodge section of the one or more locking hooks disposed alternatively between said one or more pairs of vertically flexible ribs, at the right side of each of said support walls extending upwardly a stop post and at the left side thereof disposing a spaced restraint post so as to form one or more guiding opening, said stop post and restraint post being flush with each other and being provided with a registration cavity respectively, each of said support walls including a slide slope, said sliding slope being formed at a lower level of each of said supporting walls including walls in a direction from said stop post toward said guide opening, wherein said sleeve further comprises a plurality of guide posts positioned in alignment with said guide openings of the resilient retainer so as to permit said guide posts to slide along said guide openings, wherein as the sleeve is pushed toward a direction to engage with said resilient retainer, said guide posts of said sleeve slide along said slide slopes and said stop posts stop said guiding posts at the end of the stop posts, whereby the resilient retainer is not pushed downwardly by said sleeve to make said one or more locking hooks engage with said plurality of holes of said tube body.

2. The fluid connector as claimed in claim 1 wherein said stop post is made in reverse L shape.

3. The fluid connector as claimed in claim 1 wherein said tube body is peripheral equipped with a plurality of support blocks each being disposed under one said plurality of holes thereof.

4. The fluid connector as claimed in claim 1, wherein on an inner side of each said stop post and said restraint post of said resilient retainer are disposed a registration cavity on said tube body are disposed a plurality of engagement blocks in match with said registration cavities of said stop posts and said restraint posts respectively.

5. The fluid connector as claimed in claim 1 wherein said tube body is peripherally provided with support blocks each disposed under one of said holes and at each side of each said support block is disposed a vertical engagement block respectively, and said resilient retainer has a plurality of support walls respectively having an inner cavity section defined thereon with which each said support block of said tube body is engaged; on each said stop post and said restraint post at said resilient retainer is disposed a registration cavity, on said tube body are disposed a plurality of engagement blocks in registration with said registration cavities of said stop posts and said restraint posts respectively.

6. The fluid connector as claimed in claim 1 wherein each of said one or more locking hooks of said resilient retainer integrally extends from one inner side of each said slide slope.

7. The fluid connector as claimed in claim 1 wherein each of said one or more locking hooks of said resilient retainer integrally extends from one inner side of each said slide slope to form an arc shaped dodge section.

* * * * *